(12) United States Patent
Nomura et al.

(10) Patent No.: US 11,054,399 B2
(45) Date of Patent: Jul. 6, 2021

(54) INSPECTION METHOD

(71) Applicant: Kobe Steel, Ltd., Kobe (JP)

(72) Inventors: Kota Nomura, Kobe (JP); Yasuhiro Wasa, Kobe (JP); Toshihide Fukui, Kobe (JP)

(73) Assignee: Kobe Steel, Ltd., Kobe (JP)

(*) Notice: Subject to any disclaimer, the term of this patent is extended or adjusted under 35 U.S.C. 154(b) by 157 days.

(21) Appl. No.: 16/466,081

(22) PCT Filed: Dec. 25, 2017

(86) PCT No.: PCT/JP2017/046352
§ 371 (c)(1),
(2) Date: Jun. 3, 2019

(87) PCT Pub. No.: WO2018/135242
PCT Pub. Date: Jul. 26, 2018

(65) Prior Publication Data
US 2020/0064309 A1    Feb. 27, 2020

(30) Foreign Application Priority Data
Jan. 19, 2017 (JP) .............................. JP2017-007431

(51) Int. Cl.
*G01N 29/07* (2006.01)
*G01N 29/22* (2006.01)

(52) U.S. Cl.
CPC ........... *G01N 29/07* (2013.01); *G01N 29/223* (2013.01)

(58) Field of Classification Search
CPC .... G01N 29/07; G01N 29/223; G01N 29/221; G01N 29/28; G01N 29/041;
(Continued)

(56) References Cited

U.S. PATENT DOCUMENTS 2,667,780 A    2/1954   Van Valkenburg
3,996,791 A *  12/1976  Niklas ................ G01N 29/0609
                                                        73/602
(Continued)

FOREIGN PATENT DOCUMENTS

FR    3 011 637 A1    4/2015
JP    57-171512 U     10/1982
(Continued)

OTHER PUBLICATIONS

International Search Report dated Mar. 20, 2018 in PCT/JP2017/046352 filed Dec. 25, 2017.
(Continued)

*Primary Examiner* — Suman K Nath
(74) *Attorney, Agent, or Firm* — Oblon, McClelland, Maier & Neustadt, L.L.P.

(57) ABSTRACT

A method for inspecting a test object for defects by using an ultrasonic probe including a transmitter, a wedge, and a receiver, the method comprising: placing the ultrasonic probe on the test object; transmitting ultrasound from the transmitter into the wedge such that surface waves propagate along a surface area of the test object; and determining that there is a defect in a part of the test object overlapped with the wedge when the receiver receives an ultrasonic echo, after the transmission of the ultrasound by the transmitter, in a time shorter than a time required to receive a front end-reflected ultrasonic echo produced by reflection of the surface waves at a front end of the wedge.

3 Claims, 7 Drawing Sheets

(58) Field of Classification Search
CPC ....... G01N 2291/045; G01N 2291/057; G01N 2291/101; G01N 2291/0423; G01N 2291/044; G01N 2291/011; G01N 2291/0234
See application file for complete search history.

(56) References Cited

U.S. PATENT DOCUMENTS

| | | | | |
|---|---|---|---|---|
| 4,289,030 | A * | 9/1981 | Alers | G01H 1/08 |
| | | | | 228/104 |
| 4,658,649 | A * | 4/1987 | Brook | G01N 29/11 |
| | | | | 73/624 |
| 2009/0229364 | A1* | 9/2009 | Gysling | G01N 29/4436 |
| | | | | 73/623 |
| 2016/0290973 | A1* | 10/2016 | Zhang | G01N 29/2487 |

FOREIGN PATENT DOCUMENTS

| | | |
|---|---|---|
| JP | 63-261151 A | 10/1988 |
| JP | 2010-54497 A | 3/2010 |

OTHER PUBLICATIONS

Extended European Search Report dated May 29, 2020 in Patent Application No. 17892411.4, 8 pages.

\* cited by examiner

INSPECTION METHOD

TECHNICAL FIELD

The present invention relates to a method for inspecting a test object for defects using an ultrasonic probe.

BACKGROUND ART

Conventional nondestructive methods for inspecting a test object for defects include those using an ultrasonic probe. For example, Patent Literature 1 discloses a method for inspecting a test object for defects present in a surface area (including the surface and near-surface) of the test object using an ultrasonic probe that includes a transducer having a transmitter and a receiver of ultrasound and a wedge holding the transducer. Specifically, the wedge holds the transmitter at an angle allowing the ultrasound transmitted from the transmitter to propagate as surface waves along the surface area of the test object. In this inspection method, the receiver receives an ultrasonic echo produced by the reflection of the surface waves by a defect present in the surface area of the test object, thereby allowing detection of the defect. The surface area refers to an area with a depth equal to about once or twice the wavelength of the surface waves from the surface of the test object.

In inspection methods such as the one described in Patent Literature 1, the surface waves may also be reflected by a couplant, such as oil, or a foreign matter adhered to the part of the surface of a test object that lies in front of the wedge in the propagation direction of the surface waves. The produced ultrasonic echo will be received by the receiver as a signal. Thus, it is difficult to determine whether an ultrasonic echo received by the receiver is based on a defect or any foreign matter on the surface, which can lead to an increase in false detections of defects. In other words, such a conventional inspection method requires cleaning of the surface of the inspection zone during the inspection. This makes the supply of couplant troublesome and thus makes it difficult to obtain a reliable defect detection accuracy.

CITATION LIST

Patent Literature

Patent Literature 1: Japanese Unexamined Patent Publication No. 2010-54497

SUMMARY OF INVENTION

It is an object of the present invention to provide an inspection method that allows reliable inspection while improving the accuracy of detecting a defect present in a surface area of a test object.

An inspection method according to an aspect of the present invention is a method for inspecting a test object for defects using an ultrasonic probe that includes a transmitter for transmitting ultrasound, a wedge holding the transmitter at an angle allowing the ultrasound transmitted from the transmitter to propagate as surface waves along a surface area of the test object, and a receiver for receiving an ultrasonic echo produced by reflection of the ultrasound, the method comprising the steps of: placing the ultrasonic probe on the test object; transmitting the ultrasound from the transmitter into the wedge such that the surface waves propagate along the surface area of the test object; and determining that there is a defect in a part of the test object overlapped with the wedge when the receiver receives the ultrasonic echo, after the transmission of the ultrasound by the transmitter, in a time shorter than a time required to receive a front end-reflected ultrasonic echo produced by reflection of the surface waves at a front end of the wedge in a propagation direction of the surface waves.

DESCRIPTION OF EMBODIMENTS

Figure 1:
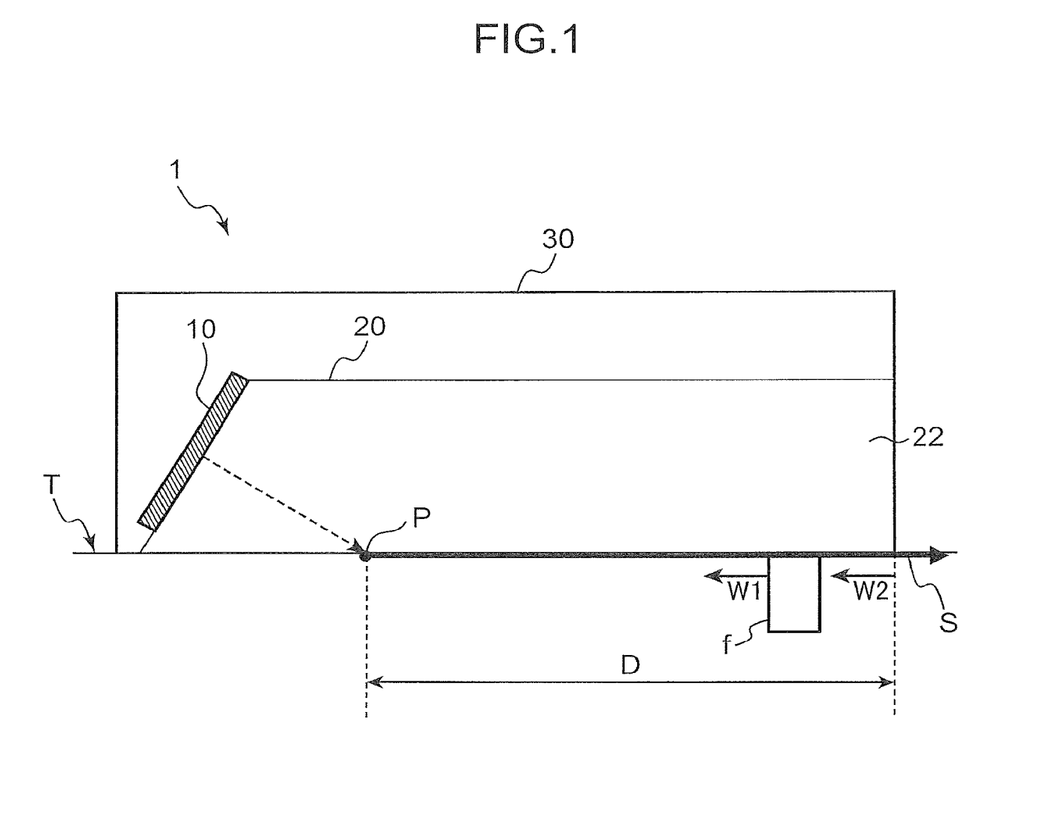
FIG. 1 is a schematic diagram of an inspection method according to an embodiment of the present invention.

An inspection method according to an embodiment of the present invention will be described with reference to FIGS. 1 to 3. The present inspection method uses surface waves S to detect a defect present on the surface and near-surface (hereinafter, referred to as "surface area") of a test object T, such as a steel material. The surface area refers to an area with a depth equal to about once or twice the wavelength of the surface waves S from the surface of the test object T. Specifically, the inspection method uses an ultrasonic probe 1 that includes a transducer 10, a wedge 20, and a casing 30 housing the transducer 10 and the wedge 20, as shown in FIG. 1.

The transducer 10 includes a transmitter for transmitting ultrasound and a receiver for receiving an ultrasonic echo produced by reflection of the ultrasound.

The wedge 20 holds the transducer 10 at an angle allowing the ultrasound transmitted from the transmitter to propagate as surface waves S (in the form of Rayleigh waves or SH waves) along the surface area of the test object T. The wedge 20 is preferably made of polyetherimide or acrylic resin, and more preferably made of polyetherimide.

The present inspection method includes a placement step, an ultrasound transmission step, and a determination step.

In the placement step, the ultrasonic probe 1 is placed on the test object T. At this time, the gap between the contact surfaces of the test object T and the ultrasonic probe 1 is filled with a couplant, such as oil, where the ultrasonic probe 1 is pressed against the test object T such that the couplant forms a uniform thin film between the bottom surface of the ultrasonic probe 1 and the test object T.

In the ultrasound transmission step, the transmitter of the transducer 10 transmits ultrasound (shown by the dotted arrow in FIG. 1). Part of the ultrasound travels straight through the wedge 20 and reaches an incident point P (i.e. the point of incidence at which the part of the ultrasound emitted from the center of the transducer 10 enters the surface of the test object T). Subsequently, the part of the ultrasound propagates as surface waves S from the incident point P along the surface area of the test object T. Even when the couplant is between the ultrasonic probe 1 and the test object T, it is in the form of a uniform thin film between the ultrasonic probe 1 and the test object T. Thus, the couplant reflects almost no ultrasound.

In the determination step, it is determined whether there is a defect f in the part of the test object T overlapped with the wedge 20 (directly under the wedge 20). Specifically, at the determination step, it is determined that there is a defect f in the part of the test object T overlapped with the wedge 20 when the receiver receives an ultrasonic echo W1, after the transmission of ultrasound by the transmitter, in a time shorter than the time required to receive a front end-reflected ultrasonic echo W2 (an ultrasonic echo produced by reflection of the surface waves S at a front end 22 of the wedge 20 in the propagation direction of the surface waves S). The reason why this determination is possible will be described with reference to FIG. 2.

Figure 2:
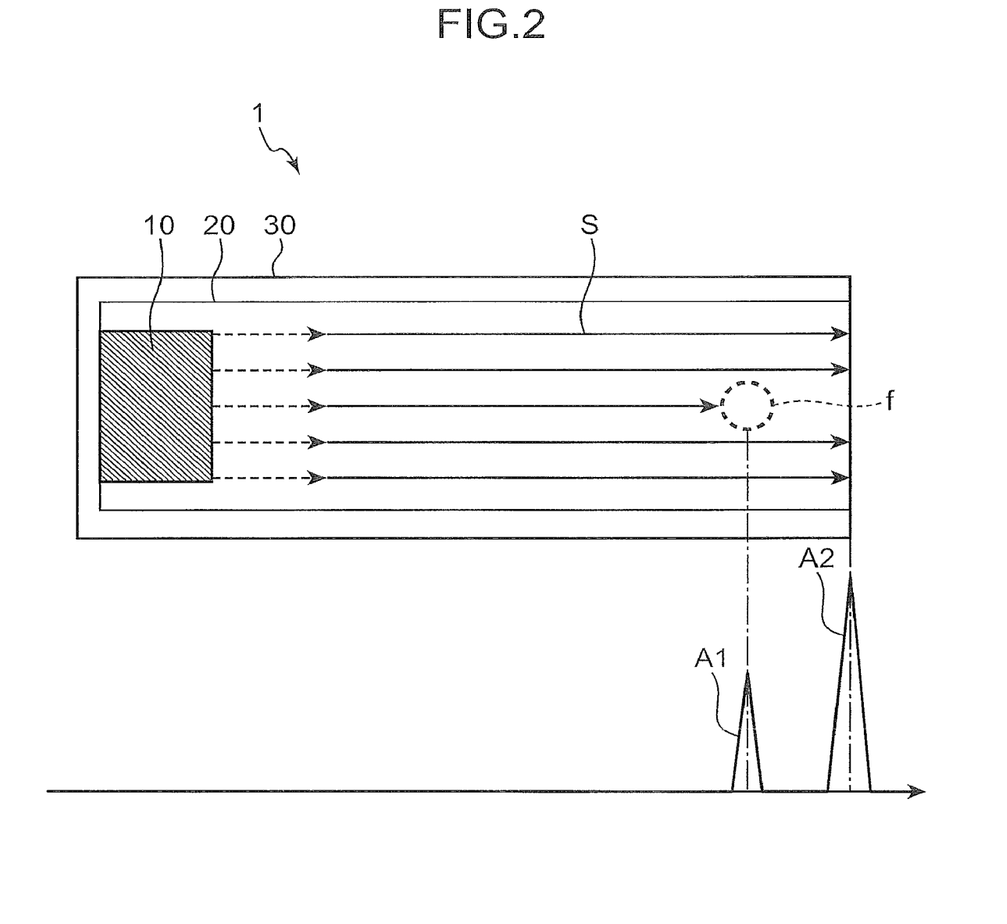
FIG. 2 is a diagram illustrating reception signals A1 and A2.

FIG. 2 illustrates a reception signal A1 that is detected when the receiver receives the ultrasonic echo W1 produced by the reflection of the surface waves S by the defect f and a reception signal A2 that is detected when the receiver receives the front end-reflected ultrasonic echo W2. As shown in FIG. 2, the reception signal A1 is detected earlier than the reception signal A2 by the receiver. Here, the time required to detect the reception signal A2 is measured in advance. This makes it possible to determine, when the receiver receives the reception signal A1 in a time shorter than the detection time for the reception signal A2 (i.e. the signal based on the front end-reflected ultrasonic echo W2), that the reception signal A1 is a signal based on the ultrasonic echo W2 produced by the reflection of the surface waves S by the defect f present directly under the wedge 20.

Figure 3:
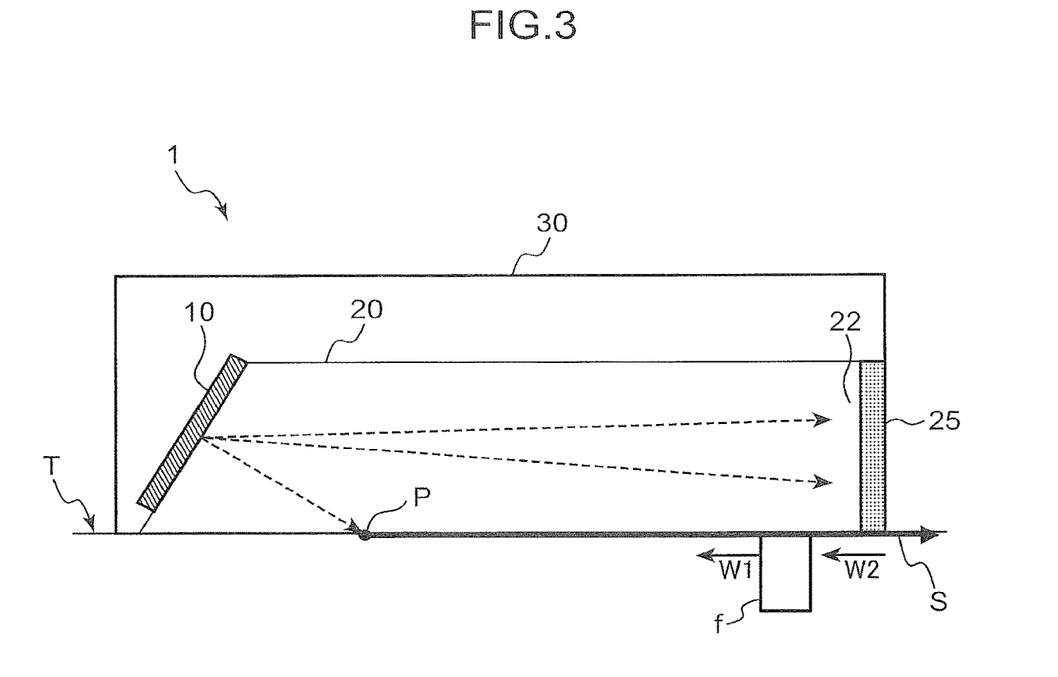
FIG. 3 is a diagram showing a modification of the inspection method shown in FIG. 1.

In the wedge placement step, the wedge 20 preferably includes an absorber 25 disposed at the front end 22 thereof for absorbing ultrasound, as shown in FIG. 3. The use of the wedge 20 including the absorber 25 will reduce the reflection of ultrasound (i.e. ultrasound or surface waves S having propagated through the wedge 20 and reached the front end 22 of the wedge 20) at the front end 22 of the wedge 20, or ultrasonic echoes.

Figure 4:
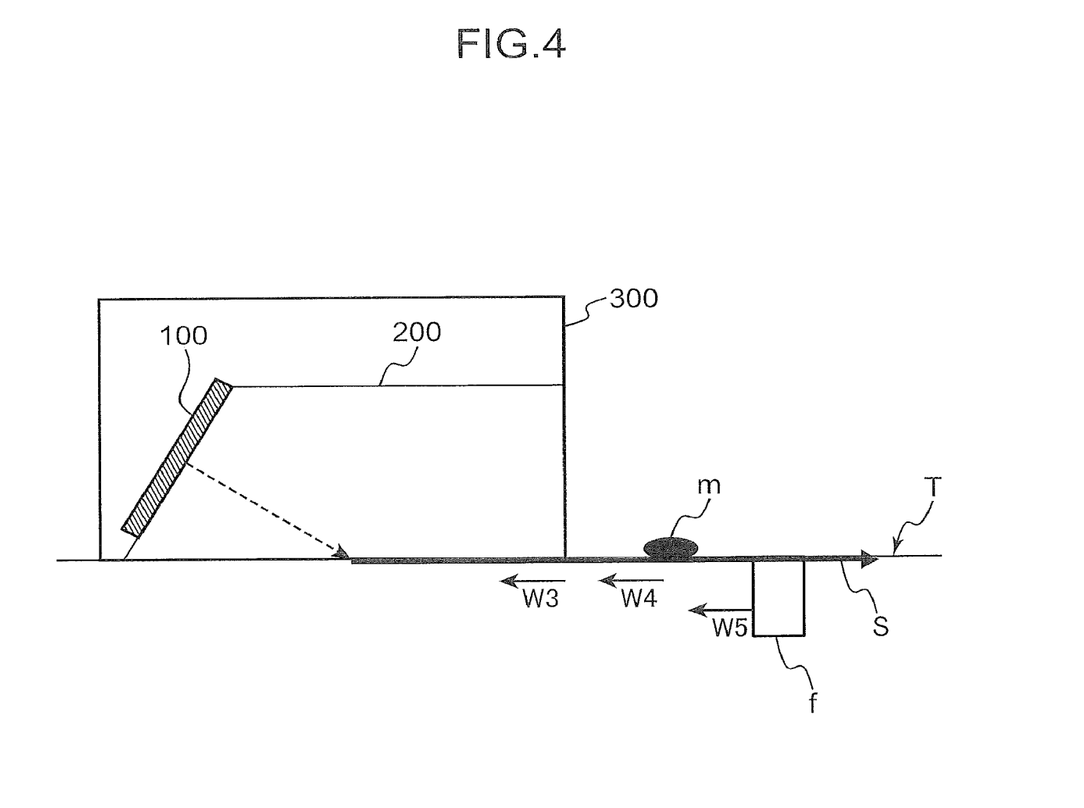
FIG. 4 is a schematic diagram of a conventional inspection method.
Figure 5:
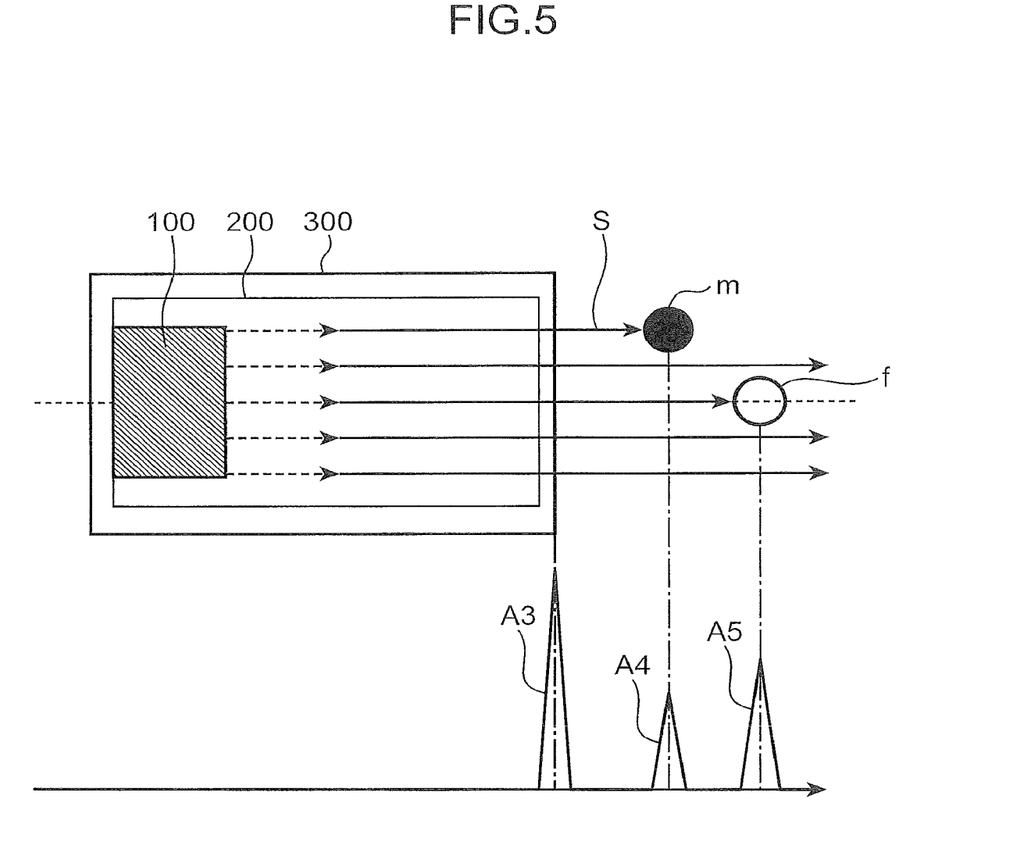
FIG. 5 is a diagram illustrating reception signals A3, A4, and A5.

Now, a conventional inspection method for detecting defects will be described with reference to FIGS. 4 and 5.

The conventional inspection method uses an ultrasonic probe including a transducer 100, a wedge 200, and a casing 300. The ultrasonic probe is configured substantially the same as in the above-described embodiment except for the wedge length in a propagation direction of surface waves S. In the conventional inspection method, a receiver of the transducer 100 receives an ultrasonic echo W5 produced by reflection of the surface waves S by a defect f present in the part of a test object T in front of the wedge 200 in the propagation direction of the surface waves S. Here, on the surface of the test object T, there may also be a couplant m, such as oil, in front of the wedge 200 in the propagation direction of the surface waves S, in which case the receiver will also receive an ultrasonic echo W4 (noise) produced by reflection of the surface waves S by the couplant m. In other words, as shown in FIG. 5, the receiver of the conventional inspection method receives a reception signal A3 based on an ultrasonic echo W3 produced by reflection of the ultrasound at a front end of the wedge 200, a reception signal A4 based on the ultrasonic echo W4 produced by the reflection of the surface waves S by the couplant m, and a reception signal A5 based on the ultrasonic echo W5 produced by the reflection of the surface waves S by the defect f. This makes it difficult to determine whether a signal received by the receiver is based on the ultrasonic echo W5 caused by the defect f or the ultrasonic echo W4 caused by the couplant m.

In contrast to such a conventional method, the inspection method according to the present embodiment detects the defect f present in the part of the surface area of the test object T overlapped with the wedge 20 (directly under the wedge). This allows a couplant m on the part of the surface of the test object T outside the part directly under the wedge to cause an ultrasonic echo (noise) that is to be detected outside the inspection zone. Thus, it is possible to improve the accuracy of detecting the defect f present in the surface area of the test object T.

In addition, the detection accuracy of the defect f is enhanced by the use of the wedge 20 including the absorber 25, as shown in FIG. 3. Specifically, in the present inspection method, the ultrasonic echo W1 is produced at the defect f before the surface waves S reach the front end 22 of the wedge 20, and therefore the absorber 25 hardly affects the production of the ultrasonic echo W1 caused by the defect f. However, in the case of detecting the defect f in front of the wedge 200 in the propagation direction as in the above-described conventional method, use of a wedge including an absorber would reduce the surface waves S propagating beyond the wedge. Consequently, the ultrasonic echo produced at the defect f would become considerably weaker. Thus, the use of the wedge 20 including the absorber 25 is particularly effective in the present inspection method of detecting the defect f present in the part directly under the wedge 20.

The disclosed embodiment is exemplary in all respects and should not be regarded as restrictive. The scope of the present invention is indicated by the scope of the claims and not by the description of the embodiment provided above, and includes all modifications within the same sense and scope as the claims.

For example, a transducer including a transmitter and a transducer including a receiver may be configured as separate units.

EXAMPLE

Now, an example of the present inspection method will be described with reference to FIGS. 6 and 7.

Figure 6:
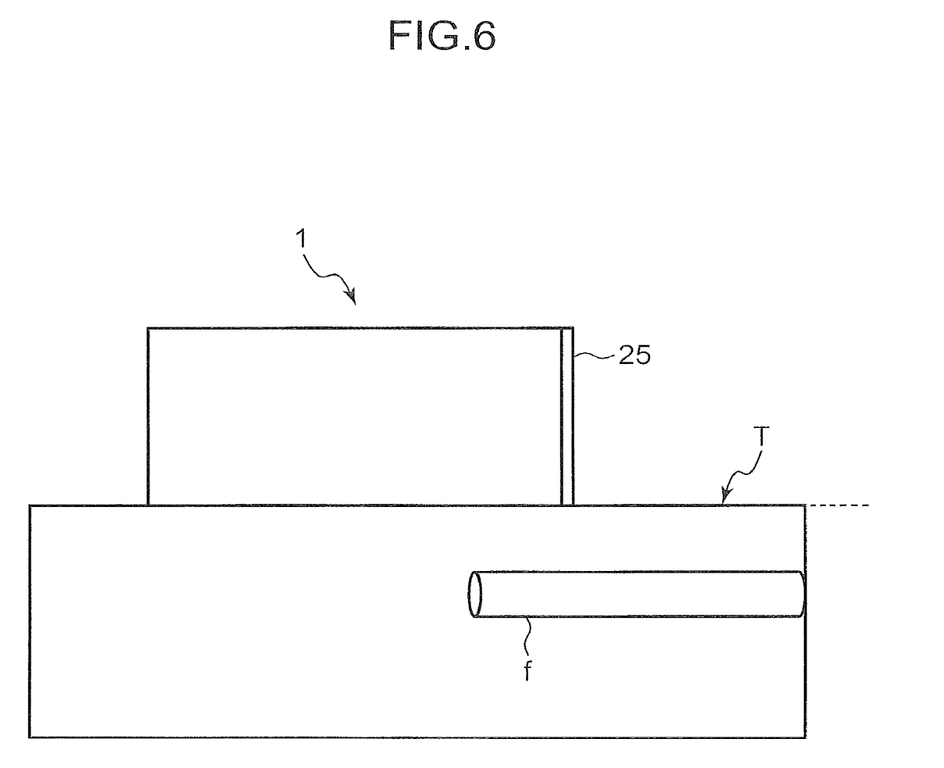
FIG. 6 is a schematic diagram showing an ultrasonic probe and a test object in an example.

As shown in FIG. 6, an ultrasonic probe 1 including an absorber 25 was used in the example. A wedge 20 has a dimension D of 10 mm from an incident point P to a front end 22. A steel material, having a horizontal hole (flat bottom hole) as a defect f, was used as a test object T. In the example, a transmitter transmitted ultrasound with a frequency of 2 MHz for four consecutive cycles. The reception signals detected at that time is shown in FIG. 7. In FIG. 7, negative values of the detection signals are reflected as positive values. In the example, because the test object T was a steel material, the wavelength $\lambda$ of surface waves S was about 1.5 mm.

Figure 7:
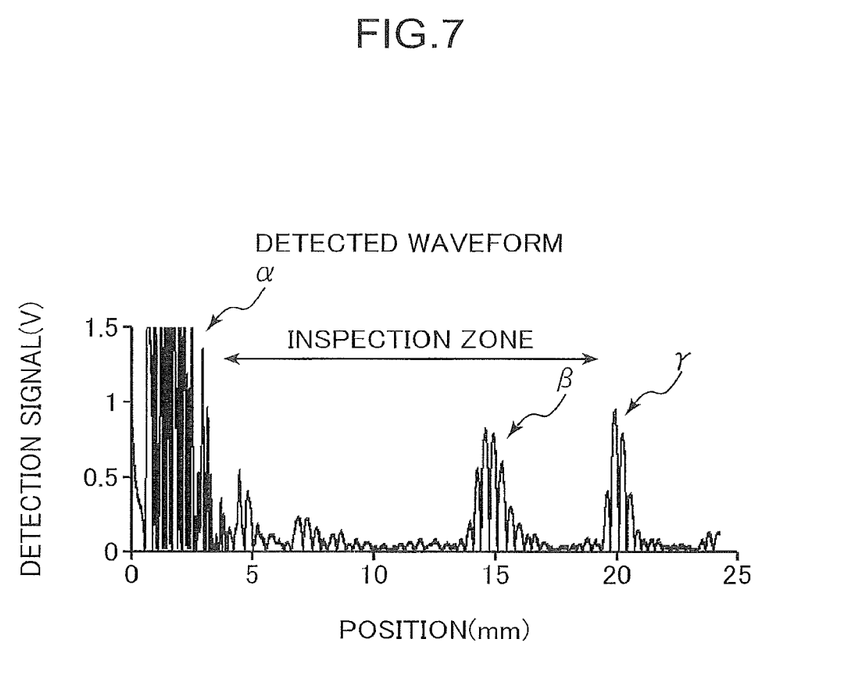
FIG. 7 is a graph showing an inspection result of the example.

In FIG. 7, the signal $\alpha$ indicates transducer reverberations, and the signal $\gamma$ indicates a reception signal detected when a receiver received the front end-reflected ultrasonic echo W2. Thus, the inspection zone ranges from the signal $\alpha$ to the signal $\gamma$ (over about seven consecutive cycles in the example). In the example, a signal $\beta$ was clearly detected in the inspection zone, the signal $\beta$ indicating the reception by the receiver of an ultrasonic echo produced by reflection of the surface waves S by the horizontal hole.

As can be seen from the above result, the wavelength of the ultrasound transmitted by the transmitter is desired to have a value falling in the range between the signal $\alpha$ and the signal $\gamma$. In other words, the dimension D is set such that the inspection zone is equal to or greater than the wavelength of the ultrasound transmitted by the transmitter. The inspection zone is desired to have a length equal to or greater than the sum of the length of a pulse (four wavelength cycles in the example) transmitted by the transmitter and one wavelength.

The described embodiment will now be summarized.

The inspection method according to the above-described embodiment is a method for inspecting a test object for defects using an ultrasonic probe that includes a transmitter for transmitting ultrasound, a wedge holding the transmitter at an angle allowing the ultrasound transmitted from the transmitter to propagate as surface waves along a surface area of the test object, and a receiver for receiving an ultrasonic echo produced by reflection of the ultrasound, the method comprising the steps of: placing the ultrasonic probe on the test object; transmitting the ultrasound from the transmitter into the wedge such that the surface waves propagate along the surface area of the test object; and determining that there is a defect in a part of the test object overlapped with the wedge when the receiver receives the ultrasonic echo, after the transmission of the ultrasound by the transmitter, in a time shorter than a time required to receive a front end-reflected ultrasonic echo produced by reflection of the surface waves at a front end of the wedge in a propagation direction of the surface waves.

Unlike the conventional method which detects a defect present in the part of the surface area of the test object in front of the wedge in the propagation direction of the surface waves, the present inspection method detects a defect present in the part of the surface area overlapped with the wedge (directly under the wedge). Here, even when a couplant, such as oil, is between the wedge and the test object, the couplant is in the form of a uniform film between the wedge and the test object. Thus, the couplant reflects almost no ultrasound. In addition, the time required before the receiver receives the front end-reflected ultrasonic echo can be uniquely determined by the structure of the ultrasonic probe. This makes it possible, when the receiver receives an ultrasonic echo, after the transmission of ultrasound by the transmitter, in a time shorter than the time required to receive the front end-reflected ultrasonic echo, to determine that the ultrasonic echo has been produced by reflection of the surface waves by the defect present directly under the wedge, i.e. there is a defect in the part of the test object overlapped with the wedge. As can be seen from the above, the present inspection method can reduce the ultrasonic echo (noise) caused by the couplant applied on the surface of the test object. This reduces false detections, thus improving the defect detection accuracy.

In this case, it is preferred that in the wedge placing step, the wedge includes an absorber disposed at the front end thereof in the propagation direction for absorbing the ultrasound.

The ultrasound transmitted from the transmitter propagates through the wedge and is reflected by the front end of the wedge to thereby also produce an ultrasonic echo. The ultrasound propagating through the wedge is liable to be detected as noise, because it is faster than the surface waves used for the inspection. However, the placement of the absorber at the front end reduces the noise, thus enhancing the defect detection accuracy. Specifically, in the present inspection method, an ultrasonic echo is produced at the defect before the surface waves reach the front end of the wedge, and therefore the absorber hardly affects the production of the ultrasonic echo caused by the defect. However, in the case of detecting a defect in front of the wedge in the propagation direction as in the conventional method, use of a wedge including an absorber would reduce the surface waves propagating beyond the wedge. Consequently, the ultrasonic echo produced at the defect would become considerably weaker. Thus, the use of the wedge including the absorber is particularly effective in the present inspection method of detecting a defect present in the part directly under the wedge.

It is also preferred in the above-described inspection method that in the wedge placing step, the wedge is made of polyetherimide.

In the method according to the present invention, the ultrasound propagates a long distance through the wedge, and is therefore greatly attenuated by the wedge. Thus, the wedge is preferably made of a material capable of preventing ultrasound attenuation. For the contact inspection method, the material is also desired to have a high wear resistance. It is therefore desired to use a wedge made of polyetherimide meeting these conditions.

The invention claimed is:

1. A method for inspecting a test object for defects using an ultrasonic probe that includes a transmitter for transmitting ultrasound, a wedge holding the transmitter at an angle allowing the ultrasound transmitted from the transmitter to propagate as surface waves along a surface area of the test object, and a receiver for receiving an ultrasonic echo produced by reflection of the ultrasound, the method comprising the steps of:

placing the ultrasonic probe on the test object;

transmitting the ultrasound from the transmitter into the wedge such that the surface waves propagate along the surface area of the test object; and determining that there is a defect in a part of the test object overlapped with the wedge when the receiver receives an ultrasonic echo, after the transmission of the ultrasound by the transmitter, in a time shorter than a time required to receive a front end-reflected ultrasonic echo produced by reflection of the surface waves at a front end of the wedge in a propagation direction of the surface waves.

2. The method according to claim 1, wherein
   in the wedge placing step, the wedge includes an absorber disposed at the front end thereof in the propagation direction for absorbing the ultrasound.

3. The method according to claim 1, wherein
   in the wedge placing step, the wedge is made of polyetherimide.

* * * * *